United States Patent [19]
Wolsky

[11] 3,850,119
[45] Nov. 26, 1974

[54] COVER CROP PLANTER

[76] Inventor: Gene V. Wolsky, 265 Viking Dr., Valley City, N. Dak. 58072

[22] Filed: Jan. 2, 1973

[21] Appl. No.: 320,095

[52] U.S. Cl. .................................................. 111/85
[51] Int. Cl. ........................................... A01c 5/00
[58] Field of Search ............ 111/85, 84, 59, 63, 64, 111/67, 79, 52; 172/198

[56] References Cited
UNITED STATES PATENTS

| | | | |
|---|---|---|---|
| 2,429,841 | 10/1947 | Phillips | 111/59 |
| 3,367,293 | 2/1968 | Cox | 111/85 X |
| 3,500,936 | 3/1970 | Vigen | 172/198 |
| 3,682,252 | 8/1972 | Gates | 172/198 |
| 3,701,327 | 10/1972 | Krumholz | 111/85 X |

Primary Examiner—Stephen C. Pellegrino
Attorney, Agent, or Firm—Frederick E. Lange

[57] ABSTRACT

A relatively narrow cover crop planter for attachment to a relatively wide tillage implement such as a field cultivator, the tillage implement having a frame designed for rigid attachment to the frame of the tillage implement so that when the frame of the tillage implement is raised for transport purposes, the planter is likewise raised. The planter has a seed hopper with a row of seed delivery spouts and three rows of rearwardly directed teeth, the forwardmost row of which is designed to break up the soil clumps loosened by the tillage implement, the second row of which are aligned with and ahead of the seed delivery spouts and are designed for form seed receiving grooves, and the rearwardmost row of which is disposed back of the seed delivery spouts but laterally displaced therefrom to cover the seed. The planter has a ground engaging wheel for driving the agitator of the planter. When the tillage implement and planter are raised to a transport position, the support for the ground engaging wheel will drop down and close off seed openings at the bottom of said hopper to prevent discharge of seed during the transporting of the equipment.

6 Claims, 9 Drawing Figures

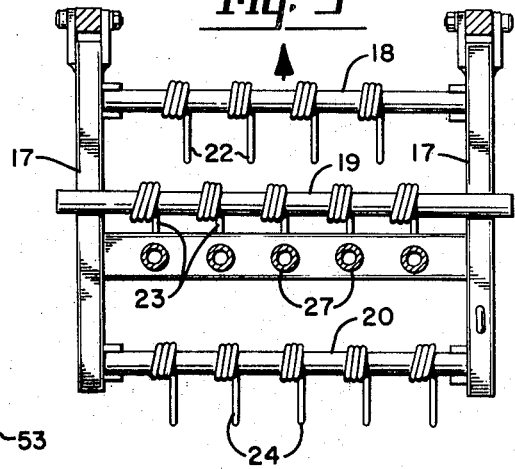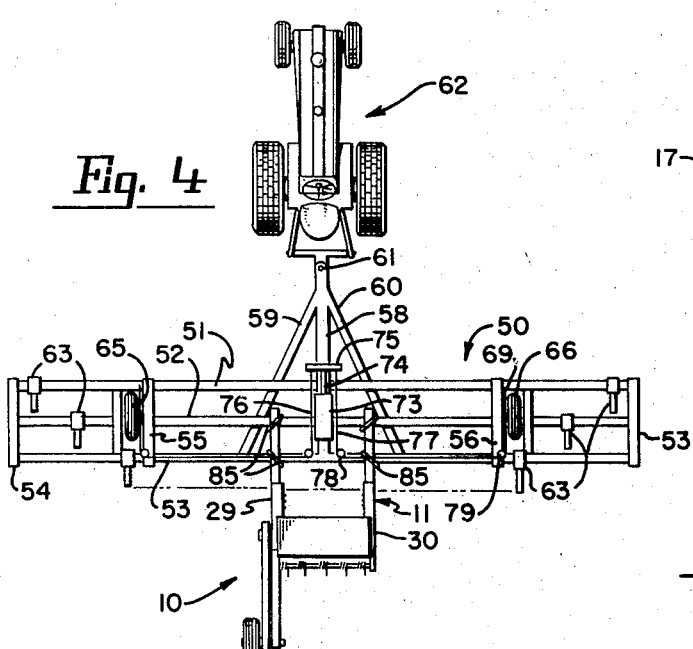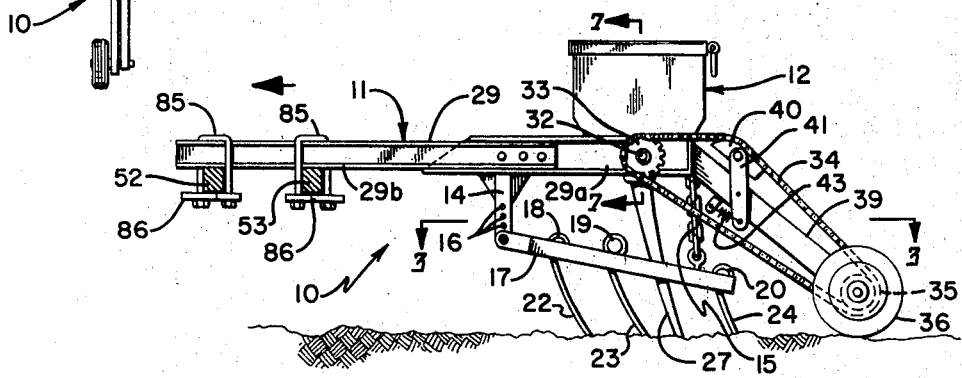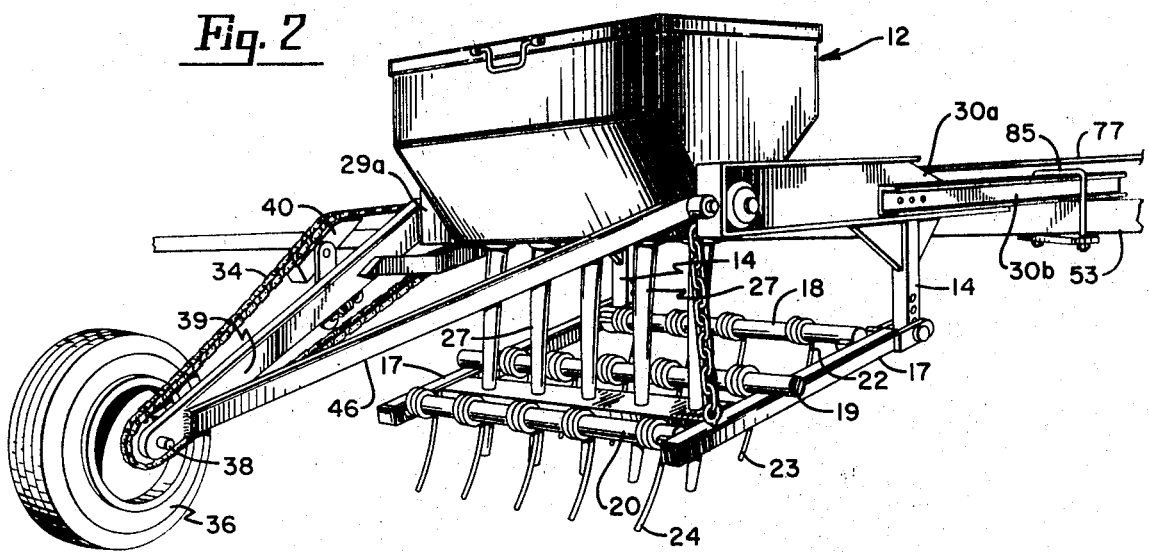

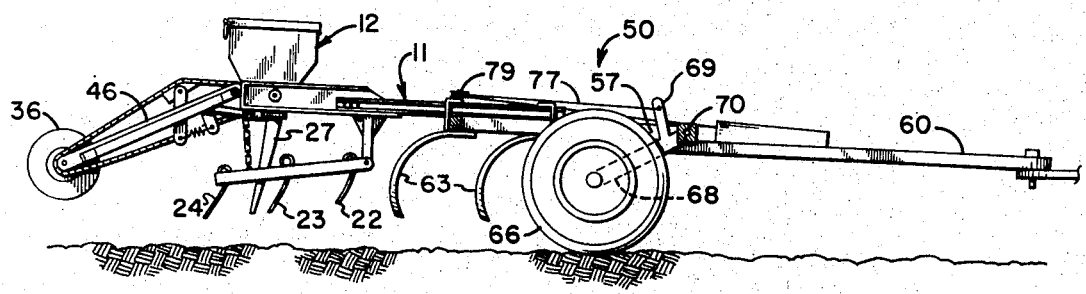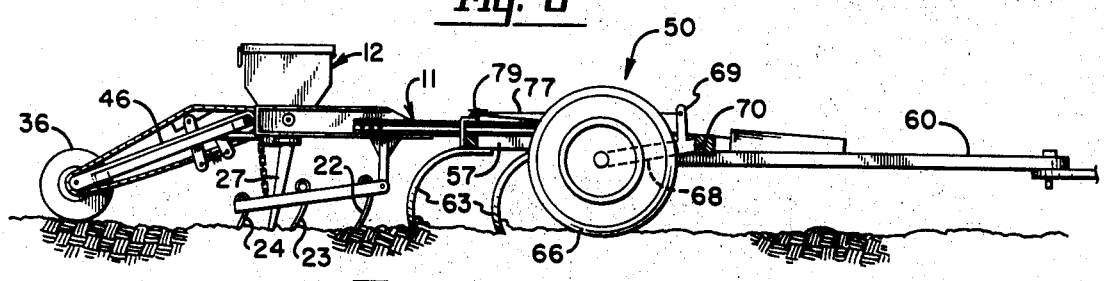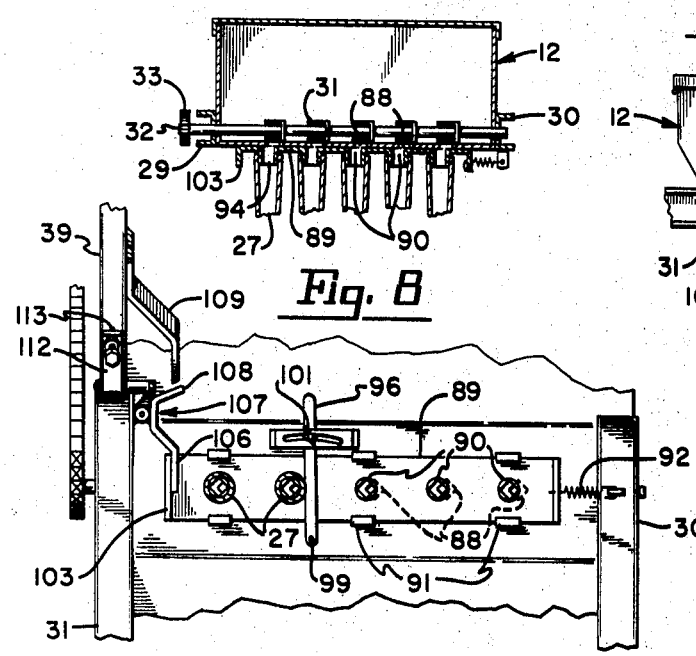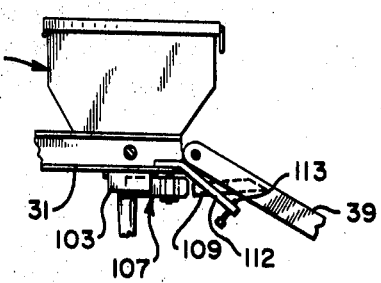

COVER CROP PLANTER

BACKGROUND OF THE INVENTION

It is customary in certain areas of the country to allow certain fields to remain fallow during what would be a normal growing season. In order to reduce the number of weeds, it is necessary to periodically cultivate such fallow fields. It is also desirable in order to reduce wind erosion to plant what are referred to as cover strips. These consist of relatively narrow strips of a relatively fast growing plant such as flax which will remain standing through the winter and act as a snow fence and wind break. These cover strips are usually approximately 20 feet apart or more to allow tillage between the strips for control of the weeds.

In the past, it has been often necessary for a farmer to make a special trip through the field simply for the purpose of planting such cover strips. This has involved the use of a seed drill which often is designed to plant much wider strips. Hence, it has been necessary to close off certain openings in order to adapt the seed drill for planting a relatively narrow strip.

In order to avoid a separate trip throught the field just for the purpose of planting the cover crop, some farmers have connected behind a conventional cultivator a pony press drill type of planter. This is however a separately towed implement which is not well adapted for rapid transport and which materially limits the extent to which the equipment can be readily turned.

SUMMARY OF THE PRESENT INVENTION

The present invention is concerned with a cover crop planter which is relatively narrow and which has provision for rigidly clamping the frame of the planter to the frame of a tillage implement. The planter has a seed hopper and a plurality of seed delivery spouts, a first row of earth working tools disposed ahead of the spouts and aligned therewith for forming seed receiving grooves and a second row of earth working tools disposed to the rear of the spouts and laterally displaced therefrom so as to act to cover the seeds in the grooves. The earth working tools are preferably directed rearwardly adjacent the point of contact with the earth being worked so as to have a minimum amount of cultivating effect. For the same reason, the earth working tools are preferably in the form of resilient teeth.

It is also desirable to provide an additional row of earth working tools disposed forwardly of the first row. This additional row is laterally displaced from the first row and functions to break up clumps of earth loosened by the tillage tools of the tillage implement. This additional row may also be in the form of resilient rearwardly directed teeth.

The planter is provided with an earth engaging wheel normally engaging the earth being worked to drive an agitator within the hopper as the planter is moved forwardly. When the planter is moved to its transport position, the frame carrying the ground engaging wheel is shifted to close off the seed openings at the bottom of the hopper. The ground engaging wheel may be mounted on a support pivotally secured to the planter frame so that when the planter frame is raised as a result of the tillage equipment being raised, the support for the ground engaging wheel is lowered to close off the openings at the bottom of the seed hopper.

Various other objects and features of the present invention will be apparent from a consideration of the accompanying specification, claims and drawing.

BRIEF DESCRIPTION OF THE DRAWING

FIG. 1 is a elevational view of my improved planter;

FIG. 2 is a perspective view of a slightly modified form of my planter viewed from the opposite side from which the planter is viewed in FIG. 1 and somewhat to the rear of the planter;

FIG. 3 is a sectional view showing a portion of the planter of FIG. 1 taken along the line 3—3 of FIG. 1 and on a somewhat larger scale than employed in FIG. 1;

FIG. 4 is a plan view showing the cover crop planter of the present invention attached to a field cultivator which in turn is being driven by a tractor;

FIG. 5 is an elevational view of a cultivator with my improved cover crop planter attached thereto, with the cultivator and planter raised to transport position;

FIG. 6 is a view similar to FIG. 5 showing the cultivator and cover crop planter lowered into working position;

FIG. 7 is a vertical sectional view taken along the line 7—7 of FIG. 1 showing only the hopper and a portion of the seed spout mechanism to show the manner in which the seed delivery openings are opened and closed;

FIG. 8 is a plan view of the underside of the seed hopper showing the mechanism for opening and closing the seed openings; and FIG. 9 is a fragmentary view showing the means by which the said closing mechanism is actuated by the pivoted support for the ground engaging wheel.

DESCRIPTION OF THE PREFERRED EMBODIMENT

Referring first to FIGS. 1 and 2, it will be noted that my improved cover crop planter 10 comprises a frame 11 on which is supported a seed hopper 12. Secured to the underside of the frame are a pair of brackets 14 only one of which is visible in FIG. 1. Each bracket 14 is provided with a series of vertically spaced holes 16 and pivotally secured to any one set of holes 16 are a pair of tool carrying bars 17. These bars are supported in the desired angular position by a chain 15 secured at its upper end to the frame 11. The bars 17 carry a series of rods 18, 19 and 20 which extend between bars 17 transverse to the longitudinal direction of the planter. Secured to rod 18 are a plurality of spring harrow teeth 22. Secured to the rod 19 are a second row of resilient harrow teeth 23 and disposed to the rear are a third row of harrow teeth 24. As is clearly evident from FIGS. 1 and 2, the lower portions of these harrow teeth are disposed rearwardly with respect to the direction of travel of the planter so that they do not dig up the soil over which they are traveling. Secured to and extending downwardly from the seed hopper 12 are a plurality of seed delivery spouts 27. In the present case, I have shown five each of harrow teeth 22, 23 and 24. As best shown in FIG. 3, the harrow teeth 22 are laterally displaced from the seed delivery spouts 27 while the harrow teeth 23 are aligned with the seed delivery spouts 27. The function of the first row of harrow teeth 22 is to break up any clumps of dirt that might have been released by the tillage instrument to which the planter is secured and to level the soil for planting. The function of the second row of harrow teeth 23 is to form seed receiving grooves in the earth that has been prepared for the first row of teeth 22. The harrow teeth 24 of the third row are laterally displaced with respect to the seed delivery spouts 27. Because the teeth are laterally displaced, they will tend to displace the dirt laterally and cover up the seed which have been deposited in the seed receiving grooves.

As best shown in FIG. 4, the frame 11 includes two parallel two part beams 29 and 30 which extend longitudinally of the planter. The beam 29 consists of two sections 29a and 29b bolted together. Similarly beam 30 consists of two sections 30a and 30b bolted together. The seed hopper 12 is secured between the rear portions of these beams and serves to hold beams 29 and 30 in properly spaced relationship. The beams 29 and 30 are secured rigidly to the frame of the tillage implement to which they are attached. The means for securing the beams 29 and 30 to the tillage implement will be discussed in more detail later.

As is conventional with planters, the hopper 12 has an agitator adjacent the bottom of it to agitate the seeds to facilitate their discharge through the release spouts 27. This agitator, which is shown in FIG. 7, comprises a plurality of paddles 31 secured to a shaft 32 which extends through the beam members 29 and 30. A sprocket wheel 33 is secured to one end of the shaft 32. Passing over and meshed with the sprocket wheel 33 is a chain 34 which passes over a sprocket wheel 35 secured to a ground engaging wheel 36. The ground engaging wheel 36 is journaled on a stub shaft 38 (best shown in FIG. 2) secured in the lower outer end of a beam 39 pivotally secured to the beam 29 of the frame 11. A chain tensioning block 40 is pivotally supported upon a bar 41 which is pivotally supported by the beam member 39. A spring 43 holds the block 40 pressed against the chain 34 to maintain it under proper tension at all times. The block 40 may be made of any material which will not severely damage the chain as the chain is rubbed against it. In one particular embodiment, I have employed a block of wood for this purpose. The beam 39 is reinforced by a further beam 46 which is rigidly secured at its lower end to beam 39 as by welding. At its upper end, beam 46 is pivotally secured to the opposite beam member 30 of the frame 11. The manner in which the beam member 46 is pivotally secured to the frame 11 is shown in FIG. 2 in connection with a slightly modified form of beam member which will be referred to later.

It will be obvious that since both beam members 39 and 46 which support the ground engaging wheel 36 are pivotally secured to the frame member 11, the ground engaging wheel 36 will drop down until it engages the ground. As the planter is moved along the ground, wheel 36 will rotate to rotate sprocket 33 to drive the agitator within the planter as will be discussed later. When the planter is raised, the wheel 36 will drop downwardly. Suitable stop means described later limit its downward movement. When the wheel drops downwardly in this manner, the movement of beam member 39 actuates means to cut off the flow of seeds through the spouts 27 by a mechanism shown in FIGS. 7, 8 and 9 and which will be discussed later.

As has been referred to previously, the planter 10 is adapted to be secured to and operated as a unit with some kind of a tillage implement such as a field cultivator. Referring to FIGS. 4, 5 and 6, a typical field cultivator is indicated in its entirety by the reference numeral 50. This cultivator is shown as comprising series of frame members 51, 52 and 53 which run longitudinally of the long dimension of the planter, but transverse to the direction of movement of the planter. These frame members or beams are joined together at spaced points by transverse beams 54, 55, 56 and 57. Secured to the longitudinal frame members 51, 52 and 53 is a tongue member 58 and two diagonal members 59 and 60 which converge at and are joined to the forward end of the tongue member 58. Tongue member 58 is in turn coupled through a suitable hitch 61 to a tractor 62. The longitudinal frame members 51, 52 and 53 act as tool bars to support three rows of cultivating tools 63 which may be any of a variety of conventional cultivating tools. The cultivator may be supported by two or more wheels 65 and 66. These wheels 65 and 66 are not directly mounted on the frame of the cultivator 50 but are supported indirectly from the transverse beams 55 and 56 by means of pivoted brackets as best shown in FIGS. 5 and 6 in connection with wheel 66. In these figures, wheel 66 is shown as supported on a bar 68 to which is secured an arm 69. The bar 68 is pivotally mounted at 70 to one of the transverse beams such as transverse beam 56. The angular position of bar 68 and hence the vertical position of wheel 66 with respect to the frame of the cultivator 50 is controlled by a hydraulic motor 73 shown in FIG. 4. This hydraulic motor has a piston 74 connected to a cross bar 75, the ends of which are connected to cables 76 and 77. Cable 77 extends over pulleys 78 and 79 to the arm 69 secured to wheel supporting bar 68. Similarly, cable 76 is looped over a pair of pulleys and runs to a similar arm secured to a wheel supporting bar associated with wheel 65. When fluid is admitted to the hydraulic cylinder 73 to force the piston rod 74 outwardly, both cables 76 and 77 are tensioned so as to move the arms of the wheel supporting bars to which they are secured. Thus, referring to FIG. 5, as cable 77 is tensioned, the arm 69 swings in a counterclockwise direction to swing the bar 68 in a counterclockwise direction to assume the position shown in FIG. 5 in which the wheels have been lowered with respect to the frame of the cultivator so as to raise the implement 63 away from the ground. At the same time, because of the fact that my planter 10 is rigidly secured to the frame of the cultivator, frame 11 of the planter is likewise raised to raise the tools 22, 23 and 24 out of the ground, and to lift the earth engaging wheel 36 out of engagement with the ground.

FIG. 6 shows the implement when the wheels have been raised to the normal position which they occupy during the cultivating and planting operation. This is accomplished by releasing the pressure in the hydraulic cylinder 73 to permit the cables 76 and 77 to be released thus permitting the arm 69 and the wheel supporting bar 68 to move in a clockwise direction. It is understood that suitable stop means are provided for restricting such movement so that the wheels 65 and 66 will assume a position in which they support the frame of the cultivator at a level proper for cultivation. If desired, this height may be adjusted by selective operation of the hydraulic cylinder 73.

Arrangements of this general type for raising and lowering a cultivator with respect to the ground are well known and the details are not important to the present invention. A typical arrangement for lifting a farm implement in this manner is shown in the Marmorine U.S. Pat. No. 3,162,459.

As best shown in connection with FIGS. 2 and 4, the beams 29 and 30 of the planter are secured to the longitudinal beams 52 and 53 of the cultivator by a plurality of U-bolts 85 which diagonally straddle the beams 29 and 30 and the beams 52 and 53. The U-bolts 85 are provided with nuts and clamping bars 86 which enable the beams 29 and 30 to be rigidly clamped to the longitudinal beams 52 and 53 at four different points. It is desirable that the clamping occur at at least three different points so that the two units are held against relative movement in any direction. In this way, the planter 10 becomes almost an integral part of the cultivator 50 and whenever the cultivator is turned, the planter is automatically turned. When, as previously explained, the cultivator is raised out of working engagement with the ground, the planter 10 is similarly raised.

In first discussing FIG. 2, reference was made to the fact that the modification of FIG. 2 is substantially like that of FIG. 1 except for the nature of the longitudinal beams forming the frame 11 of planter 10. It will be noted that the beam section 30b in the FIG. 2 modification has somewhat less vertical depth than the beam section 30a. Similarly, beam section 29b in the FIG. 2 modification (not shown in FIG. 2) has the same reduced vertical depth as beam section 30b of the FIG. 2 modification. Thus, the two species of FIGS. 1 and 2 are identical except for the fact that beams 29b and 30b which are bolted to beam sections 29a and 30a are of less vertical height in the FIG. 2 modification than in the FIG. 1 modification. The modification of FIG. 2 is intended for employment with cultivators of the type employing cables for raising and lowering the wheels, which cables are disposed in the manner shown in FIG. 4. It will be apparent from FIG. 4 that cables 76 and 77 run parallel with and slightly above the longitudinal beam 53. Since beam sections 29b and 30b extend over beam sections 53 and 52, it would be obvious that they would interfere with the operation of the cables if they were of the same height as beam sections 29a and 30a. This is shown in FIG. 2 where a portion of cable 77 is visible. In cultivators where other means are employed for raising and lowering the wheels of the cultivator with respect to the frame, the form of FIG. 1 may be employed.

Provision is made for closing off the openings at the bottom of the seed hopper 12 when the cultivator, and hence the planter, is being transported. As has also been explained, this is accomplished as a result of wheel 36 and the beam supports 39 and 46 swinging downwardly when the planter is raised for the purpose of transporting it. The mechanism for accomplishing this will now be described. Referring to FIGS. 7 and 8, it will be noted that the bottom of the hopper is provided with a plurality of passages 88. In the example shown, I have shown five such passages 88, corresponding to the number of seed spouts 27. Slidably secured to the underside of the hopper, is a closure plate 89 having a series of openings 90 which are so spaced that when the closure plate 89 is in one particular position with respect to the hopper 12, the openings 90 are aligned with the openings 88 in the bottom of the hopper. The closure plate 89 is held in sliding engagement with the underside of the hopper by a plurality of guide members 91 fixed to the underside of the hopper and having portions spaced from the bottom of the hopper by the thickness of the closure plate 89 and overlying the closure plate so as to provide a support for closure plate 89 which permits longitudinal sliding movement thereof. The closure plate is biased to a position in which the openings 88 and 90 are aligned by a spring 92 which extends between the closure plate 89 and the beam 30.

Secured to the underside of the closure plate 89, are a series of nipples 94 aligned with the openings 90. The release spouts 27 are fastened over these nipples 94 and are secured thereto by any suitable means such as clamps.

As shown in FIG. 8, the openings 90 are not fully aligned with the openings 88 in the bottom of the hopper which latter openings are partially shown in dotted lines in FIG. 8. This is for the purpose of adjusting the size of the openings depending upon the size of the seed and the desired rate of flow. The extent to which the closure plate 89 is allowed to move in opening direction is controlled by a stop bar 96 which is pivoted at 99 to the underside of the hopper. The angular position of the bar 96 can be adjusted and the bar can be held in any adjusted position by a clamping means including a wing nut 101. The bar 96 lies in the path of one of the seed spouts 27 and when the seed spout engages the bar 96, further movement of closure plate 89 to the right (as viewed in FIG. 8) is prevented. It will be obvious that if bar 96, as viewed in FIG. 8, is swung in a clockwise direction beyond that shown, the closure plate 89 can move to a position in which the seed passages are fully opened. As the bar 96 is moved to the left, the extent to which the seed passages can be opened is reduced. The end of the closure plate 89 has a flange 103 which is designed to cooperate with one arm 106 of a lever 107 pivotally secured to the frame member 31 and adapted to be engaged by arm 109 carried by the swinging beam 39 which supports the planter wheel 36. As best shown in FIGS. 8 and 9, this arm 109 is effective as the beam 39 drops downwardly when the planter is raised, to engage the outer arm 108 of the lever 107 and rock the inner end to the left (as viewed in FIG. 8). This forces the closure plate 89 to the left to a position in which the openings 90 are completely out of alignment with the openings 88 so that no seed can pass downwardly through the spouts 27. Thus, when the planter is being transported, the flow of seeds is automatically cut off. It is, of course, also appreciated that since the ground engaging wheel is no longer engaging the ground, the agitator in the hopper 12 is no longer being operated. This further aids in preventing the loss of any seed.

As previously stated, I provide stop means to limit the downward movement of the beam 39 supporting the wheel 36. This stop means takes the form of an arm 112 secured to the beam 31 and having an abutment member 113 secured to the outer end thereof to abut the beam 39 when it reaches a predetermined position. This insures that the wheel 36 will be held out of engagement with the ground while the planter is being transported.

Referring to the overall use of the apparatus, the tillage implement 50, such as a field cultivator, can be used throughout most of the season in the normal manner. When it is necessary, however, to plant a cover crop, all that it is necessary to do is to attach my improved planter to the tillage implement by the U-bolts 85. It will be noted that these are longitudinally adjustable along the beams 29 and 30 so that they enable the planter to be readily attached to any conventional cultivator. When the planter is thus attached, it thereafter requires no further attention other than maintaining an adequate amount of seed in the seed hopper 12. The planter functions as a unit integral with the cultivator 50. It can be transported with the cultivator at the same speed at which the cultivator can be transported. The mechanism for lowering the cultivator into cultivating position also operates automatically to lower the planter. The cultivator is then operated in a series of passes across the field which are sufficiently spaced to leave room between the cover crop strips adequate to permit the subsequent passage of the cultivator between the strips. While this involves leaving narrow strips of the field uncultivated at the time that the cover crop strips are being planted, the major portion of the field, however, is cultivated at this time. Thus, with very little additional effort and with the same maneuverability as a farmer has with his cultivator, the cover crop can be planted as an incident to a normal cultivating operation. The saving in time is extremely important since the planting of the cover crop often occurs during the harvest period when the farmer is extremely busy and has no time for separate cultivating and planting operations.

CONCLUSION

It will be readily seen that I have provided a relatively narrow planter which is adapted to be rigidly attached to and operate as a rigid extension of a conventional wide tillage implement. In this way, it is possible for a farmer to simultaneously cultivate his field and plant a relatively narrow row of seeds suitable for a cover crop now. The planter can be readily disconnected from the tillage implement when it is desired that the latter be used in the normal manner for cultivating the field. When the planter is attached to the tillage implement, it in no way interferes with the operation of or the transporting of the implement. There is no problem on turns since the planter is rigidly carried by the implement and turns with it. Since it is relatively narrow, it does not in any way restrict the turning radius even though the planter projects to the rear of the implement.

It will also be seen that the delivery chutes of the planter are automatically closed whenever the implement is moved to a position for transporting the same.

While I have shown certain specific embodiments of my invention, it is to be understood that this is for purposes of illustration only and that the scope of the invention is limited solely by the appended claims.

I claim as my invention:

1. A cover crop planter for planting relatively narrow rows of a cover crop while the field is being cultivated, said cover crop planter being designed for attachment to and support by a relatively wide tillage implement having a frame comprising a plurality of spaced beam members extending longitudinally of said implement and transversely to the direction of movement thereof, tillage tools secured to said frame, wheels for supporting the frame, and means for raising the frame with respect to the wheels to withdraw the tillage tools from engagement with the ground, said planter comprising:

a planter frame having a forwardly extending portion designed to be placed over and engage at least two spaced beam members of a tillage implement frame, said planter frame having an overall width which is relatively small compared with the width of such a tillage implement, at least three longitudinally and laterally spaced, readily detachable, clamping means carried by said planter frame and positionable to clamp rigidly said forwardly extending portion of said planter frame to two spaced longitudinal beam members of such an implement frame so that when said implement frame is raised with respect to its wheels the entire planter frame is also raised, a seed hopper carried by said planter frame and having a plurality of seed delivery spouts extending downwardly therefrom to adjacent the ground, said delivery spouts being disposed in a row extending transversely of the planter, a first row of resilient earth working tools directed rearwardly adjacent their point of contact with the earth, said earth working tools being carried by a tool support adjustably secured to said planter frame and being disposed ahead of said spouts, each of said tools being aligned with one of said spouts for forming seed receiving grooves, a second row of resilient earth working tools directed rearwardly adjacent their point of contact with the earth, said second row of tools also being carried by said support but being disposed to the rear of said spouts, each earth working tool being laterally displaced from a corresponding one of the spouts so as to act to cover the seeds in the grooves, means for pivotally securing said tool support to said frame at any of various vertical pivotal positions to define a vertically adjustable horizontal pivotal axis for said tool support and to enable the vertical position of the tools to be adjusted to accommodate for variations in the height of the frame of the tillage implement to which the planter is attached, and a flexible member for limiting the downward pivotal movement of said tool support, said cover crop planter having no elements which control the operation of the cultivator to which it is attached so that upon release of said clamping means and detachment of said planter from the cultivator, the latter can be used without alteration as a cultivator.

2. A cover crop planter in accordance with claim 1 in which there is an additional row of earth working tools disposed forwardly of said first row of earth working tools, each tool of said additional row being laterally displaced from a corresponding tool in said first row and functioning to break up clumps of earth loosened by the tillage tools of said tillage implement.

3. A cover crop planter in accordance with claim 2 in which all three rows of earth working tools are in the form of resilient teeth disposed rearwardly adjacent their point of contact with the earth being worked.

4. A cover crop planter for planting relatively narrow rows of a cover crop while the field is being cultivated, said cover crop planter being designed for attachment to and support by a relatively wide tillage implement having tillage tools, wheels for supporting the implement, and means for raising the tillage implement with respect to the wheels to withdraw the tillage tools from engagement with the ground, said planter comprising:

a planter frame having a forwardly extending portion designed to be placed over and engage a tillage implement, at least three longitudinally and laterally spaced clamping means carried by said frame and positionable to clamp rigidly said forwardly extending portion of said frame to such an implement so that when said implement is raised with respect to its wheels the entire planter frame is also raised, a seed hopper carried by said frame and having a plurality of seed delivery spouts extending downwardly therefrom to adjacent the ground, said delivery spouts being disposed in a row extending transversely of the planter, a first row of earth working tools disposed ahead of said spouts, each aligned with one of said spouts for forming seed receiving grooves, a second row of earth working tools disposed to the rear of said spouts, each earth working tool being laterally displaced from a corresponding one of the spouts so as to act to cover the seed in the grooves, said hopper having an agitator therein adjacent the bottom thereof and a plurality of said openings at the bottom thereof between the hopper and the said delivery spouts, a closure means movably supported by the planter frame for selectively closing off said seed openings, an earth engaging wheel and means for movably supporting said earth engaging wheel from said planter frame with said wheel normally engaging the earth being worked, coupling means between said earth engaging wheel and the agitator within the hopper effective to cause the former to drive the latter as the planter is moved forwardly, and means coupling said ground engaging wheel to said closure means for causing said closure means to close off said seed openings upon said cover crop planter being moved to a position in which the ground engaging wheel is no longer in its normal ground engaging position.

5. A cover crop planter in accordance with claim 4 in which the means for supporting the ground engaging wheel is a pivotal support pivotally secured to the planter frame so that when said planter frame is raised as a result of the tillage equipment being raised to withdraw the tillage tools from the ground, the support and the ground engaging wheel are lowered, and in which the means for closing off said openings is effective to close said openings when the pivoted support for the ground engaging wheel is lowered as a result of the planter being so raised.

6. The combination with a relatively wide tillage implement having a frame comprising a plurality of spaced beam members extending longitudinally of said implement and transversely to the direction of movement thereof, tillage tools secured to said frame, wheels for supporting the frame, and means for raising the frame with respect to the wheels to withdraw the tillage tools from engagement with the ground, of a single cover crop planter detachably secured to and supported by said tillage implement for planting relatively narrow rows of a cover crop while the field is being cultivated by said tillage implement, said planter comprising:

a planter frame having a forwardly extending portion placed over and engaging at least two spaced beam members of the tillage implement frame, said planter frame having an overall width which is relatively small compared with the width of such a tillage implement, at least three longitudinally and laterally spaced, readily detachable, clamping means carried by said planter frame and clamping rigidly said forwardly extending portion of said planter frame to two spaced longitudinal beam members of said implement frame so that when said implement frame is raised with respect to its wheels the entire planter frame is also raised, a seed hopper carried by said planter frame and having a plurality of seed delivery spouts extending downwardly therefrom to adjacent the ground, said delivery spouts being disposed in a row extending transversely of the planter, a first row of earth working tools carried by a tool support adjustably secured to said planter frame, said first row of earth working tools being disposed ahead of said spouts and each of said tools being aligned with one of said spouts for forming seed receiving grooves, a second row of earth working tools carried by said tool support and disposed to the rear of said spouts, each earth working tool being laterally displaced from a corresponding one of the spouts so as to act to cover the seeds in the grooves, and means for adjusting said tool support to adjust the vertical positions of said tools in accordance with the height of the frame of the tillage implement, said cover crop planter having no elements which control the operation of the tillage implement to which it is attached so that upon release of said clamping means and detachment of said planter from the tillage implement, the latter can be used without alteration for its intended purpose.

* * * * *